United States Patent [19]

Presson et al.

[11] 3,862,890
[45] Jan. 28, 1975

[54] FRACTIONAL DISTILLATION USING A VAPOR SIDE STREAM TO CONTROL HCN CONCENTRATION IN PURIFICATION OF CRUDE NITRILES

[76] Inventors: Robert D. Presson, 23460 Cannon Rd., Bedford Heights, 44146; Albert J. Grigsby, 2008 Pinelawn Dr., Toledo, both of Ohio 43614

[22] Filed: Nov. 5, 1973

[21] Appl. No.: 412,703

Related U.S. Application Data

[63] Continuation-in-part of Ser. No. 177,553, Sept. 3, 1971, abandoned.

[52] U.S. Cl. ................ 203/71, 203/14, 203/99, 203/DIG. 3, 260/465.9
[51] Int. Cl. .......................... C07c 121/32
[58] Field of Search ............ 203/DIG. 3, 99, 14, 81, 203/71; 260/465.9, 465.3

[56] References Cited
UNITED STATES PATENTS

| | | | |
|---|---|---|---|
| 3,149,055 | 9/1964 | Houghland | 203/14 |
| 3,196,085 | 7/1965 | Dippel | 260/465.9 |
| 3,374,263 | 3/1968 | Weitz et al | 260/465.9 |
| 3,399,120 | 8/1968 | Lovett | 260/465.9 |
| 3,445,347 | 5/1969 | Borrel et al | 260/465.9 |
| 3,507,755 | 4/1970 | Bitners et al | 260/465.9 |

*Primary Examiner*—Wilbur L. Bascomb, Jr.
*Attorney, Agent, or Firm*—Herbert D. Knudsen; John F. Jones; Sherman J. Kemmer

[57] ABSTRACT

Crude acrylonitrile or crude methacrylonitrile containing small amounts of water and HCN are fractionally distilled in a drying column to take an overhead stream of nitrile, water and HCN and a bottoms stream of the nitrile and HCN. The invention is a vapor side stream taken from the bottom half of the column which is very convenient to purify by a simple fractional distillation.

5 Claims, 1 Drawing Figure

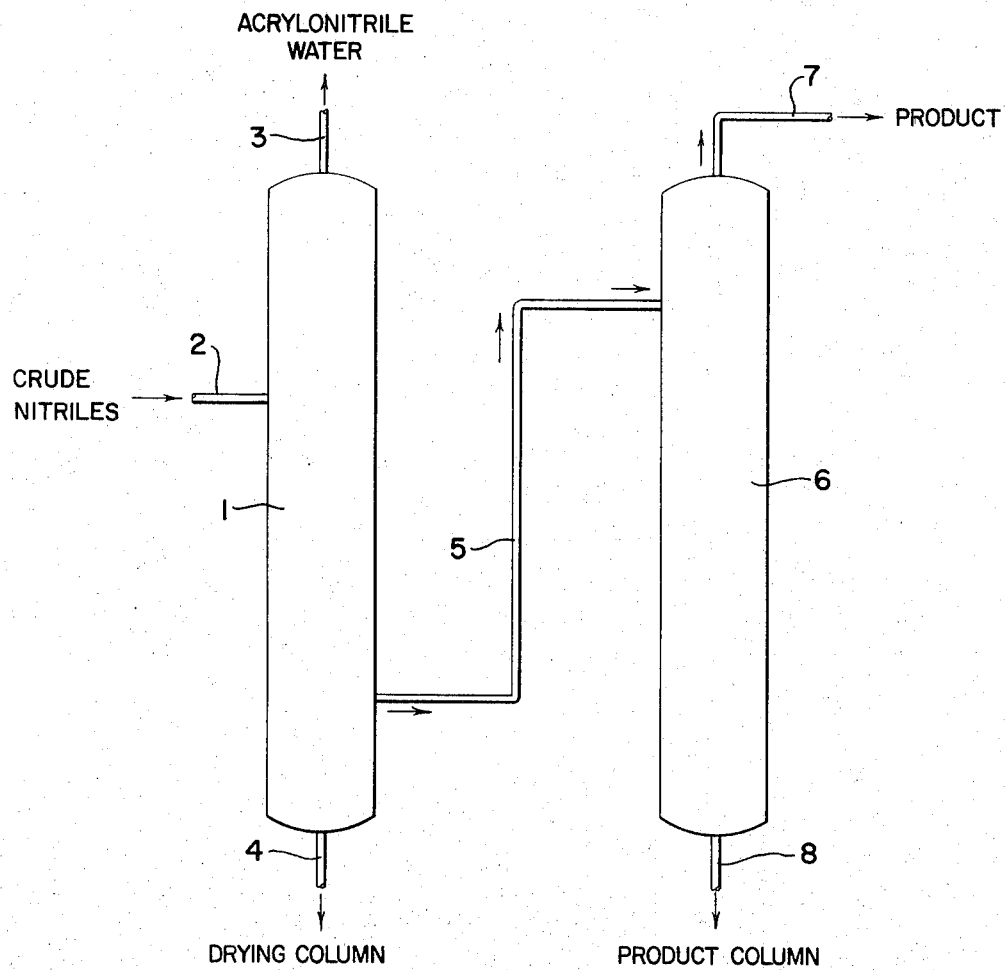

FRACTIONAL DISTILLATION USING A VAPOR SIDE STREAM TO CONTROL HCN CONCENTRATION IN PURIFICATIN OF CRUDE NITRILES

CROSS REFERENCE TO RELATED APPLICATION

This application is a continuation-in-part of our prior application Ser. No. 177,553 filed Sept. 3, 1971 and now abandoned. The specification and claims of our prior application are hereby incorporated by reference.

SUMMARY OF THE INVENTION

The present invention deals with a technique that is used to purify certain methacrylonitrile streams or acrylonitrile streams to control the amounts of HCN in the product. With respect to the purification of crude acrylonitrile, it has been discovered in the process for the purification of crude acrylonitrile containing 2 to 12 percent by weight of water and 300 to 15,000 parts by weight of HCN, wherein crude acrylonitrile is fed to a drying column and fractional distillation is conducted to give an overhead stream of acrylonitrile, water and HCN, and a bottoms stream containing acrylonitrile and HCN, the improvement comprising removing a vapor side stream from the bottom half of the drying column. With respect to the purification of crude methacrylonitrile, it has been discovered in the process for the purification of crude methacrylonitrile containing 1 to 5 percent by weight of water, 2 to 6 percent by weight of acrylonitrile and 300 to 15,000 ppm by weight of HCN, wherein the crude methacrylonitrile is fed to a drying column and fractional distillation is conducted to give an overhead stream containing acrylonitrile, HCN, methacrylonitrile and water, and a bottoms stream containing methacrylonitrile and HCN, the improvement comprising removing a vapor side stream from the bottom half of the drying column. The process of the present invention permits recovery of acrylonitrile or methacrylonitrile with desirably low (less than 300 ppm) amounts of HCN.

The present invention is best understood by reference to the drawing.

DESCRIPTION OF THE DRAWING

The FIGURE shows a representation of two fractional distillation columns and the associated inlets and outlets. Referring to the FIGURE, the first column is the drying column 1 that is fed with crude nitriles through inlet 2. In the drying column 1 fractional distillation is conducted to give an overhead stream taken off through line 3 and a bottoms stream through line 4. The invention is the vapor side stream 5 taken from the lower half of the drying column 1. This vapor side stream contains a desirably low concentration of HCN and in the preferred practice of the invention, is then purified in the product column 6.

The vapor side stream is passed through conduit 5 and enters product column 6. In the product column, fractional distillation is conducted to give an overhead stream through conduit 7 that is the purified nitrile product. The bottoms from the product column are passed through conduit 8.

In the purification of acrylonitrile, the crude acrylonitrile is fed to the drying column, and fractional distillation is conducted to take an overhead stream of acrylonitrile, water and HCN and a bottoms stream of acrylonitrile and HCN. The invention is the vapor side stream of acrylonitrile plus a small amount of HCN that is readily purified by simple fractional distillation.

For the purification of methacrylonitrile, the crude methacrylonitrile is fed to the column and fractional distillation is conducted to give an overhead stream of methacrylonitrile, acrylonitrile, water and HCN under a bottoms stream of methacrylonitrile and HCN. The invention is the vapor side stream of methacrylonitrile containing a small amount of HCN.

DESCRIPTION OF THE PREFERRED EMBODIMENTS

As noted above, the vapor side stream from the bottom half of the drying column is the invention. In the preferred practice of the invention, the vapor side stream is further purified by simple fractional distillation in the product column.

Also preferred in the present invention are crude nitrile feed streams that contain less than 9,000 ppm by weight of HCN, with those streams containing 1000 to 5000 ppm being especially preferred. These streams are best suited for the process of the present invention.

The present invention makes it possible to conveniently obtain a purified nitrile free from undesirable quantities of HCN.

SPECIFIC EMBODIMENTS

Comparative Example A — Purification of drying column bottoms stream.

A crude methacrylonitrile stream containing 4 percent by weight of acrylonitrile, 3 percent water and a varying concentration of HCN between 1,000 and 5,000 ppm was fed to a conventional drying column wherein there is no vapor side stream and the bottoms of the drying column are fed to the product column.

The bottoms stream from the drying column was methacrylonitrile containing 1,000 to 5,000 ppm of HCN. Fractional distillation of this stream in the product column produced an overhead product stream that contained 30,000 ppm of HCN. This is clearly an unacceptable commercial product.

Example 1 — Effect of vapor side stream.

An outlet for drawing a vapor side stream was installed in the above drying column. Under substantially the same operating conditions, the vapor side stream taken off had a concentration of 20 to 200 ppm of HCN depending on whether the feed to the drying column was 1,000 to 5,000 ppm of HCN. This vapor side stream was purified in a product column to give a methacrylonitrile product containing less than 5 ppm of HCN.

We claim:

1. In the process for the purification of crude acrylonitrile containing 2 to 12 percent by weight of water and 300 to 15,000 p.p.m. by weight of HCN, wherein crude acrylonitrile is fed to a drying column and fractional distillation is conducted to give an overhead stream of acrylonitrile, water and HCN, and a bottoms stream containing acrylonitrile and HCN, the improvement comprising removing a vapor side stream from the bottom half of the drying column, and feeding said vapor side stream to the top half of a product column wherein distillation is conducted to remove purified acrylonitrile overhead.

2. The process of claim 1 wherein the crude acrylonitrile contains less than 9,000 ppm by weight of HCN.

3. In the process for the purification of crude methacrylonitrile containing 1 to 5 percent by weight of water, 2 to 6 percent by weight of acrylonitrile and 300 to 15,000 p.p.m. by weight of HCN, wherein the crude methacrylonitrile is fed to a drying column and fractional distillation is conducted to give an overhead stream containing acrylonitrile, HCN, methacrylonitrile and water, and a bottom stream containing methacrylonitrile and HCN, the improvement comprising removing a vapor side stream from the bottom half of the drying column and feeding said vapor side stream to the top half of a product column wherein distillation is conducted to remove purified methacrylonitrile overhead.

4. The process of claim 3 wherein the crude methacrylonitrile contains less than 9000 ppm by weight of HCN.

5. The process of claim 3 wherein the HCN concentration is 1,000 to 5,000 ppm.

* * * * *